United States Patent
Vosgueritchian et al.

(10) Patent No.: US 10,006,820 B2
(45) Date of Patent: Jun. 26, 2018

(54) MAGNETIC INTERFERENCE AVOIDANCE IN RESISTIVE SENSORS

(71) Applicant: Apple Inc., Cupertino, CA (US)

(72) Inventors: Michael Vosgueritchian, Cupertino, CA (US); Sinan Filiz, Cupertino, CA (US); John Stephen Smith, Cupertino, CA (US); Anshuman Bhuyan, Cupertino, CA (US); James E. Pedder, Cupertino, CA (US); Vikram Garg, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/063,985

(22) Filed: Mar. 8, 2016

(65) Prior Publication Data
US 2017/0261387 A1    Sep. 14, 2017

(51) Int. Cl.
| | |
|---|---|
| *G01L 1/12* | (2006.01) |
| *G01L 1/22* | (2006.01) |
| *G01B 7/16* | (2006.01) |
| *G06F 3/00* | (2006.01) |

(52) U.S. Cl.
CPC .............. *G01L 1/2268* (2013.01); *G01B 7/18* (2013.01); *G06F 3/00* (2013.01)

(58) Field of Classification Search
CPC  G01B 7/16; G01L 1/2268; G01L 9/16; G01L 1/04; G01L 1/12
USPC ............................................ 73/779, 862.627
See application file for complete search history.

(56) References Cited

U.S. PATENT DOCUMENTS

| | | | | |
|---|---|---|---|---|
| 3,876,912 | A | * | 4/1975 | Sanders ................. H01C 13/02 338/309 |
| 4,345,477 | A | * | 8/1982 | Johnson ................ G01L 1/2281 257/419 |
| 4,423,640 | A | | 1/1984 | Jetter |
| 4,516,112 | A | | 5/1985 | Chen |
| 4,634,917 | A | | 1/1987 | Dvorsky et al. |
| 4,695,963 | A | * | 9/1987 | Sagisawa ............... B25J 13/081 414/5 |
| 4,951,510 | A | | 8/1990 | Holm-Kennedy et al. |

(Continued)

FOREIGN PATENT DOCUMENTS

| | | |
|---|---|---|
| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Harshad R Patel
*Assistant Examiner* — Octavia Hollington
(74) *Attorney, Agent, or Firm* — Brownstein Hyatt Farber Schreck, LLP

(57) ABSTRACT

A strain-responsive sensor incorporating a strain-sensitive element is disclosed. The strain-sensitive element includes a matched-pair of resistive structures disposed on opposite sides of a substrate. One resistive structure of the matched pair is coupled to a crossover, either a physical crossover or a soft crossover, such that current within the resistive structures of the matched pair flows in the same direction.

20 Claims, 9 Drawing Sheets

(56) References Cited

U.S. PATENT DOCUMENTS

| | | | |
|---|---|---|---|
| 5,481,905 A * | 1/1996 | Pratt | G01L 9/0042 73/114.43 |
| 5,577,021 A | 11/1996 | Nakatani et al. | |
| 5,616,846 A | 4/1997 | Kwasnik | |
| 5,708,460 A | 1/1998 | Young | |
| 5,790,215 A | 8/1998 | Sugahara | |
| 5,915,285 A | 6/1999 | Sommer | |
| 6,288,829 B1 | 9/2001 | Kimura | |
| 6,369,865 B2 | 4/2002 | Hinata | |
| 6,637,276 B2 | 10/2003 | Adderton et al. | |
| 6,812,161 B2 | 11/2004 | Heremans | |
| 7,154,481 B2 | 12/2006 | Cross et al. | |
| 7,176,897 B2 | 2/2007 | Roberts | |
| 7,190,350 B2 | 3/2007 | Roberts | |
| 7,196,694 B2 | 3/2007 | Roberts | |
| 7,211,885 B2 | 5/2007 | Nordal et al. | |
| 7,320,253 B2 | 1/2008 | Hanazawa et al. | |
| 7,392,716 B2 * | 7/2008 | Wilner | G01L 1/2231 73/754 |
| 7,441,467 B2 * | 10/2008 | Bloom | G01L 1/20 73/819 |
| 7,511,702 B2 | 3/2009 | Hotelling | |
| 7,724,248 B2 | 5/2010 | Saito | |
| 7,755,616 B2 | 7/2010 | Jung et al. | |
| 8,020,456 B2 | 9/2011 | Liu et al. | |
| 8,050,876 B2 | 11/2011 | Feen et al. | |
| 8,077,154 B2 | 12/2011 | Emig et al. | |
| 8,132,468 B2 | 3/2012 | Radivojevic | |
| 8,243,225 B2 | 8/2012 | Kai et al. | |
| 8,266,971 B1 | 9/2012 | Jones | |
| 8,305,358 B2 | 11/2012 | Klighhult et al. | |
| 8,421,483 B2 | 4/2013 | Klinghult et al. | |
| 8,434,369 B2 | 5/2013 | Hou et al. | |
| 8,456,430 B2 | 6/2013 | Oliver et al. | |
| 8,519,974 B2 | 8/2013 | Berggren | |
| 8,605,053 B2 | 12/2013 | Murphy et al. | |
| 8,648,816 B2 | 2/2014 | Homma et al. | |
| 8,669,952 B2 | 3/2014 | Hashimura et al. | |
| 8,669,962 B2 | 3/2014 | Kuan | |
| 8,681,122 B2 | 3/2014 | Pirogov et al. | |
| 8,692,646 B2 | 4/2014 | Lee et al. | |
| 8,711,128 B2 | 4/2014 | Small et al. | |
| 8,780,060 B2 | 7/2014 | Maschmeyer et al. | |
| 8,780,074 B2 | 7/2014 | Castillo et al. | |
| 8,780,543 B2 | 7/2014 | Molne et al. | |
| 8,870,087 B2 | 10/2014 | Coogan et al. | |
| 8,878,803 B2 | 11/2014 | Kimura et al. | |
| 8,988,384 B2 | 3/2015 | Krah | |
| 9,024,910 B2 | 5/2015 | Stephanou et al. | |
| 9,030,427 B2 | 5/2015 | Yasumatsu | |
| 9,057,653 B2 | 6/2015 | Schediwy et al. | |
| 9,063,599 B2 | 6/2015 | Yanagi et al. | |
| 9,081,460 B2 | 7/2015 | Jeong et al. | |
| 9,099,971 B2 | 8/2015 | Lynn et al. | |
| 9,110,532 B2 | 8/2015 | Ando et al. | |
| 9,116,569 B2 | 8/2015 | Stacy et al. | |
| 9,116,570 B2 | 8/2015 | Lee et al. | |
| 9,182,849 B2 | 11/2015 | Huang et al. | |
| 9,182,859 B2 | 11/2015 | Coulson et al. | |
| 9,223,162 B2 | 12/2015 | DeForest et al. | |
| 9,246,486 B2 | 1/2016 | Yang et al. | |
| 9,262,002 B2 | 2/2016 | Momeyer et al. | |
| 9,262,003 B2 | 2/2016 | Kitchens | |
| 9,292,115 B2 | 3/2016 | Kauhanen | |
| 9,304,348 B2 | 4/2016 | Jang | |
| 9,383,848 B2 | 7/2016 | Daghigh | |
| 9,417,696 B2 | 8/2016 | DeLuca | |
| 9,417,725 B1 | 8/2016 | Watazu et al. | |
| 9,454,268 B2 | 9/2016 | Badaye et al. | |
| 9,466,783 B2 | 10/2016 | Olien et al. | |
| 9,501,167 B2 | 11/2016 | Day | |
| 9,507,456 B2 | 11/2016 | Watazu et al. | |
| 9,542,028 B2 | 1/2017 | Filiz et al. | |
| 9,612,170 B2 | 4/2017 | Vosgueritchian et al. | |
| 9,658,722 B2 | 5/2017 | Schwartz | |
| 9,665,200 B2 | 5/2017 | Filiz et al. | |
| 9,690,413 B2 | 6/2017 | Filiz | |
| 9,690,414 B2 | 6/2017 | Kano et al. | |
| 9,729,730 B2 | 8/2017 | Levesque et al. | |
| 2002/0149571 A1 | 10/2002 | Roberts | |
| 2004/0008191 A1 | 1/2004 | Poupyrev et al. | |
| 2007/0159561 A1 | 7/2007 | Chien | |
| 2008/0165159 A1 | 7/2008 | Soss et al. | |
| 2008/0218488 A1 | 9/2008 | Yang et al. | |
| 2009/0002199 A1 | 1/2009 | Lainonen et al. | |
| 2009/0189866 A1 | 7/2009 | Haffenden et al. | |
| 2009/0267902 A1 | 10/2009 | Nambu et al. | |
| 2009/0316380 A1 | 12/2009 | Armstrong | |
| 2010/0053116 A1 | 3/2010 | Daverman et al. | |
| 2010/0103115 A1 | 4/2010 | Hainzl | |
| 2010/0117809 A1 | 5/2010 | Dai et al. | |
| 2011/0045285 A1 | 2/2011 | Saiki et al. | |
| 2011/0248839 A1 | 10/2011 | Kwok et al. | |
| 2011/0261021 A1 | 10/2011 | Modarres et al. | |
| 2011/0285660 A1 | 11/2011 | Prabhu et al. | |
| 2012/0038577 A1 | 2/2012 | Brown et al. | |
| 2012/0086666 A1 | 4/2012 | Badaye et al. | |
| 2012/0105367 A1 | 5/2012 | Son et al. | |
| 2012/0127136 A1 | 5/2012 | Schneider et al. | |
| 2012/0154299 A1 | 6/2012 | Hsu et al. | |
| 2012/0188198 A1 | 7/2012 | Jeong et al. | |
| 2012/0293491 A1 | 11/2012 | Wang et al. | |
| 2013/0074988 A1 | 3/2013 | Chou | |
| 2013/0082970 A1 | 4/2013 | Frey et al. | |
| 2013/0141365 A1 | 6/2013 | Lynn et al. | |
| 2013/0147739 A1 | 6/2013 | Aberg et al. | |
| 2013/0154933 A1 | 6/2013 | Sheik-Nainar | |
| 2013/0155059 A1 | 6/2013 | Wang et al. | |
| 2013/0215056 A1 | 8/2013 | Johansson et al. | |
| 2013/0328803 A1 | 12/2013 | Fukushima et al. | |
| 2013/0333922 A1 | 12/2013 | Kai et al. | |
| 2013/0342501 A1 | 12/2013 | Moine et al. | |
| 2014/0118635 A1 | 5/2014 | Yang | |
| 2014/0174190 A1 | 6/2014 | Kulkarni et al. | |
| 2014/0191973 A1 | 7/2014 | Zellers et al. | |
| 2015/0002452 A1 | 1/2015 | Klinghult | |
| 2015/0101849 A1 | 4/2015 | Bockmeyer et al. | |
| 2015/0116260 A1 | 4/2015 | Hoen et al. | |
| 2015/0268725 A1 | 9/2015 | Levesque et al. | |
| 2015/0301684 A1 | 10/2015 | Shimamura | |
| 2015/0331517 A1 | 11/2015 | Filiz et al. | |
| 2016/0033389 A1 | 2/2016 | Serpe | |
| 2016/0035290 A1 | 2/2016 | Kim et al. | |
| 2016/0041672 A1 | 2/2016 | Hoen et al. | |
| 2016/0048266 A1 | 2/2016 | Smith et al. | |
| 2016/0062517 A1 | 3/2016 | Meyer et al. | |
| 2016/0117035 A1 | 4/2016 | Watazu et al. | |
| 2016/0139717 A1 | 5/2016 | Filiz et al. | |
| 2016/0147353 A1 | 5/2016 | Filiz et al. | |
| 2016/0306481 A1 | 10/2016 | Filiz et al. | |
| 2016/0357297 A1 | 12/2016 | Picciotto et al. | |
| 2017/0031495 A1 | 2/2017 | Smith | |
| 2017/0075465 A1 | 3/2017 | Pedder et al. | |
| 2017/0090638 A1 | 3/2017 | Vosgueritchian et al. | |
| 2017/0090655 A1 | 3/2017 | Zhang et al. | |
| 2017/0191884 A1 | 7/2017 | Vosgueritchian et al. | |
| 2017/0269757 A1 | 9/2017 | Filiz et al. | |
| 2017/0285799 A1 | 10/2017 | Iuchi et al. | |
| 2017/0285864 A1 | 10/2017 | Pedder et al. | |
| 2018/0067612 A1 | 3/2018 | Smith | |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101950224 | 1/2011 |
| CN | 102012772 | 4/2011 |
| CN | 102047088 | 5/2011 |
| CN | 102165400 | 8/2011 |
| CN | 102175362 A | 9/2011 |
| CN | 102460351 | 5/2012 |
| CN | 102591519 | 7/2012 |

(56) References Cited

FOREIGN PATENT DOCUMENTS

| | | |
|---|---|---|
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 204461655 U | 7/2015 |
| CN | 104866134 | 8/2015 |
| CN | 204576454 U | 8/2015 |
| CN | 105444662 | 3/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/038833 | 12/1996 |
| WO | WO 02/035461 | 5/2002 |
| WO | WO 07/074800 | 7/2007 |
| WO | WO 11/156447 | 12/2011 |
| WO | WO 12/168892 | 12/2012 |
| WO | WO 13/177322 | 11/2013 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

Rausch, "Printed piezoresistive strain sensors for monitoring of light-weight structures," SENSOR+TEST Conferences 2011—Sensor Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

\* cited by examiner

MAGNETIC INTERFERENCE AVOIDANCE IN RESISTIVE SENSORS

FIELD

Embodiments described herein generally relate to strain-responsive sensors and, more particularly, to systems and methods for avoiding interference caused by changing magnetic fields in matched-pair resistive sensors.

BACKGROUND

An electronic device can include an input surface to receive a force input from a user. A sensor coupled to the input surface can be configured to generate a signal corresponding to a deformation of the input surface that results from the force input. The signal can be used by the electronic device to determine an operation to perform in response to the force input.

The performance of the sensor may be affected by the precision with which the deformation of the input surface is detected. In many cases, the sensor includes a strain-sensitive element coupled to the input surface to measure strain experienced by the input surface as a result of the deformation. However, in some cases, a measurement obtained from the strain-sensitive element is affected by interference caused by changing magnetic fields, which may originate at components such as speakers, haptic feedback elements, inductive power transfer interfaces, microphones, styluses, and so on.

SUMMARY

Certain embodiments described herein reference a strain-responsive sensor including at least a strain-sensitive element. The strain-sensitive elements itself includes a substrate, a first resistive structure and a second resistive structure. The resistive structures are coupled to opposite sides of a substrate and are aligned with one another. The resistive structures are also coupled to an electrical circuit. In these embodiments, the second resistive structure is coupled to a crossover such that current flows within the second resistive structure in the same direction as the first resistive structure.

Further embodiments described herein may relate to, include, or take the form of an input sensor including at least a substrate including at least an upper surface, and a lower surface, a strain-responsive sensor with an array of strain-sensitive elements. Each strain-sensitive element of the strain-responsive sensor includes an upper resistive structure and a lower resistive structure. A crossover is also incorporated such that current within the lower resistive structure flows in the same direction as current within the upper resistive structure. In these embodiments, at least one pair of upper resistive structures share a drive lead and at least one pair of lower resistive structures share a drive lead.

Further embodiments described herein reference a method of operating a strain-responsive sensor including at least the operations of: applying a voltage to a first resistive structure of the strain-responsive sensor; applying a voltage of the same polarity to a second resistive structure of the strain-responsive sensor; measuring an output voltage of a balancing network; and associating the measured output voltage with an amount of strain experienced by one or both of the first resistive structure and the second resistive structure.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, it is intended to cover alternatives, modifications, and equivalents as may be included within the spirit and scope of the described embodiments as defined by the appended claims.

The use of the same or similar reference numerals in different figures indicates similar, related, or identical items.

Figure 1:
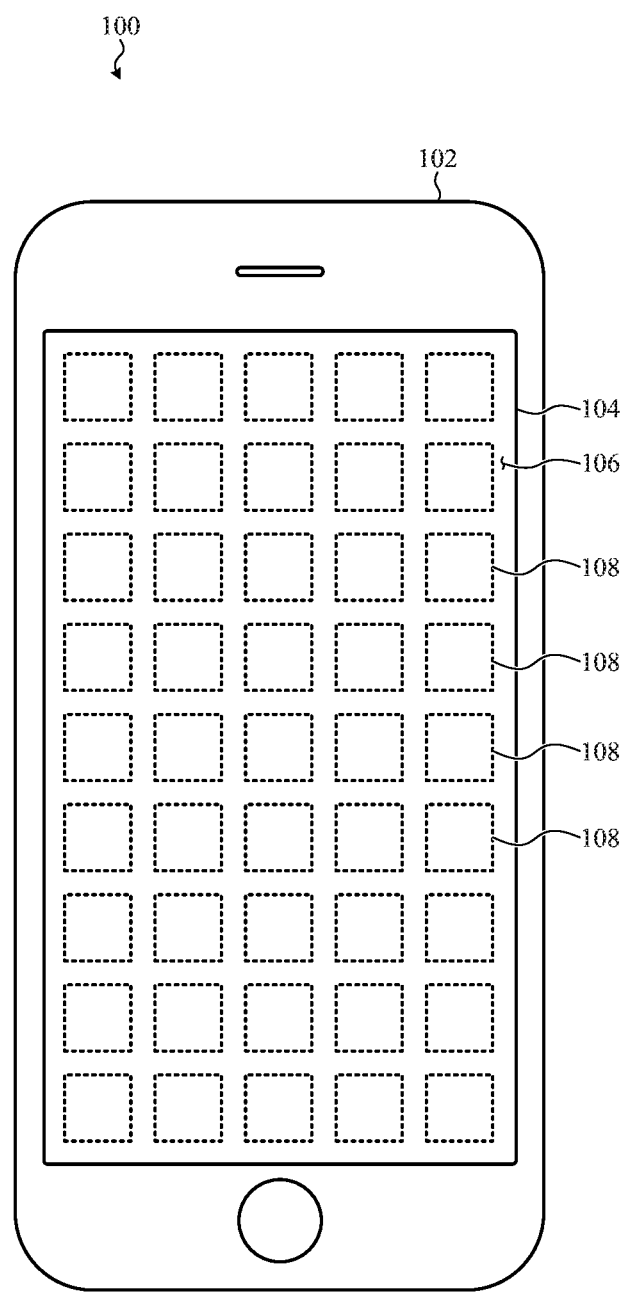
FIG. 1 depicts an electronic device with an input surface configured to receive force input from a user.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device that gathers pressure or force input from a user.

The electronic device can perform an operation based on characteristics of the force input such as, but not limited to: presence or absence of the force input, a magnitude of the force input, a rate of change of the magnitude of the force input, a location of one or more focal points of the force input, a change in a location of one or more focal points of the force input, a duration of the force input, and so on. The electronic device can perform the operation at any suitable time during or after the force input is applied by the user. Example electronic devices include, but are not limited to: portable electronic devices, fixed electronic devices, cellular telephones, tablet computing devices, wearable computing devices, peripheral input devices, industrial or equipment control devices, transportation devices, navigation devices, medical devices, health devices, and so on.

In many embodiments, the electronic device includes a strain-responsive sensor. The strain-responsive sensor is coupled, either directly or indirectly, to an input surface of the electronic device. The input surface defines an external surface of the electronic device and is configured to receive the force input from the user. In some cases, the input surface is a protective outer layer of a display. The strain-responsive sensor typically includes a strain-sensitive element and an electrical circuit.

The strain-sensitive element of the strain-responsive sensor is configured to experience compression or tension when the input surface flexes in response to the force input. The strain-sensitive element can abut, or can be coupled to, the input surface or another element or layer adjacent to the input surface. The strain-sensitive element can be formed, at least in part, from a material that exhibits an electrical resistance that changes as a function of strain such as, but not limited to, a peizoresistive material.

The electrical circuit of the strain-responsive sensor is configured to measure the electrical resistance of the strain-sensitive element, either directly or indirectly. A measured resistance can be correlated to a magnitude of strain experienced by the input surface which, in turn, can be correlated to a magnitude of the force input applied by the user.

In many cases, the strain-sensitive element is implemented with a number of independent resistive structures each formed from the same material and formed generally in the same pattern. This configuration can be used to mitigate or eliminate noise introduced as a result of unpredictable environmental conditions, such as changes in temperature.

For example, a typical configuration of the strain-sensitive element includes a matched-pair of two resistive structures, one disposed on each side of a single layer or stratiform substrate. The resistive structures are formed with the same material and are disposed in the same pattern and arranged and aligned so as to mirror one another. Generally and broadly, the two resistive structures of a strain-sensitive element are referred to herein as an "upper" resistive structure and a "lower" resistive structure. In the aligned and mirrored configuration, environmental conditions affect the upper resistive structure and the lower resistive structure in substantially the same manner such that any noise introduced by these conditions can be canceled using a suitable measurement technique, such as a differential measurement technique.

In many embodiments, the upper and lower resistive structures can take a generally-looped shape, such as a spiral shape. This configuration can increase the sensitivity of the strain-responsive sensor by increasing a dimension of the resistive structure that can be strained. Other shapes include, but are not limited to: linear serpentine shapes, radial serpentine shapes, doubled-back spiral shapes, and so on.

In many cases, changing magnetic fields can induce a measurable electromotive force within the resistive structures. The induced electromotive force may be more pronounced in resistive structures taking a generally-looped shape, such as those described above. In certain configurations, the induced electromotive force can introduce noise as a voltage that can affect the accuracy and/or precision of the strain-responsive sensor.

In particular, some resistive structures may be coupled in a circuit that can be modeled from certain frames of reference as an open loop. More specifically, certain configurations can be modeled as an open loop from a frame of reference generally normal to the plane of the substrate (e.g., top-down view of the stacked and aligned resistive structures). In these configurations, current flows through an upper resistive structure in one direction and through a lower resistive structure in the opposite direction. In other words, the current path through the lower resistive structure doubles back upon the current path through the upper resistive structure. By Lenz's law, a changing magnetic field (e.g., varying magnetic flux) generally normal to the plane of the substrate would induce an electromotive force within the open loop to oppose that magnetic field. However, because the loop is open, the electromotive force induces a voltage. This voltage can interfere with the operation of the strain-responsive sensor, especially for implementations in which the resistive structures of a strain-sensitive element are configured in a voltage-divider or balancing network configuration.

Accordingly, to offset the potential effects of changing magnetic fields, the resistive structures of embodiments described herein are coupled to one another in a circuit such that current flows in the same direction through each structure. This configuration can be modeled as a closed loop from a frame of reference generally normal to the plane of the substrate. In these configurations, current flows through the upper resistive structure and the lower resistive structure in the same direction. In other words, the current path through the lower resistive structure continues upon the current path through the upper resistive structure. By Lenz's law, a changing magnetic field (e.g., varying magnetic flux) generally normal to the plane of the substrate would induce an electromotive force within the closed loop to oppose that magnetic field. Because the loop is closed, the electromotive force induces a current. Such a current does not interfere with the operation of the strain-responsive sensor in which the resistive structures of a strain-sensitive element are configured in a voltage-divider or balancing network configuration. More specifically, a voltage-divider or balancing network configuration is substantially unaffected by the induced current because the induced current effects the upper resistive structure and the lower resistive structure in substantially the same manner (e.g., induced current does not result in significant voltage change at measurement node(s) of the voltage-divider or balancing network).

In many embodiments, a strain-responsive sensor may include an array (or group) of strain-sensitive elements, each implemented with a matched-pair of resistive structures coupled to one another in a circuit such that current flows in the same direction through each structure.

These and other embodiments are discussed below with reference to FIGS. 1-6. However, those skilled in the art will readily appreciate that the detailed description given herein with respect to these figures is for explanation only and should not be construed as limiting.

FIG. 1 shows an electronic device 100 that can include a strain-responsive sensor with a strain-sensitive element such as described herein. More generally, a strain-responsive sensor may be generally referred to as an "input sensor."

The electronic device 100 includes a housing 102 to retain, support, and/or enclose various components of the electronic device 100, such as a display 104. The display 104 may be any suitable display element. For example, the display 104 may include a stack of multiple layers including, for example, and in no particular order: an organic light emitting diode layer, a cover layer, a touch input layer, and so on. Other embodiments can implement the display 104 in a different manner, such as with liquid crystal display technology, electronic ink technology, quantum dot technology, and so on. In many embodiments, a protective outer layer of the display 104 defines an input surface 106.

The various layers of the display 104, regardless of the implementation-specific display technology selected for a particular embodiment, may be adhered together with an optically transparent adhesive and/or may be supported by a common frame such that the layers abut one another. A common frame may extend around a perimeter, or a portion of the perimeter, of the layers, may be segmented around the perimeter, a portion of the perimeter, or may be coupled to the various layer of the display 104 in another manner.

The common frame can be made from any suitable material such as, but not limited to: metal, plastic, ceramic, acrylic, and so on. The common frame, in some embodiments, may be a multi-purpose component serving an additional function such as, but not limited to: providing an environmental and/or hermetic seal to one or more components of the display 104 or the electronic device 100; providing structural support to the housing 102; providing pressure relief to one or more components of the display 104 or the electronic device 100; providing and defining gaps between one or more layers of the display 104 for thermal venting and/or to permit flexing of the layers in response to a force applied to the input surface 106; and so on.

In some embodiments, the layers of the display 104 may be attached or deposited onto separate substrates that may be laminated or bonded to each other. The display 104 may also include or be positioned adjacent to other layers suitable for improving the structural or optical performance of the display 104, including, but not limited to, a cover glass sheet, polarizer sheets, color masks, and the like. Additionally, the display 104 may include a touch sensor for determining the location of one or more touches on the input surface 106 of the electronic device 100. In many examples, the touch sensor is a capacitive touch sensor configured to detect the location and/or area of one or more touches of a user's finger and/or a passive or active stylus on the input surface 106.

The electronic device 100 can also include a processor, memory, power supply and/or battery, network connections, sensors, input/output ports, acoustic elements, haptic elements, digital and/or analog circuits for performing and/or coordinating tasks of the electronic device 100, and so on. For simplicity of illustration, the electronic device 100 is depicted in FIG. 1 without many of these elements, each of which may be included, partially and/or entirely, within the housing 102 and may be operationally or functionally associated with or coupled to the display 104.

Furthermore, although illustrated as a cellular phone, the electronic device 100 can be another electronic device that is either stationary or portable, taking a larger or smaller form factor than illustrated. For example, in certain embodiments, the electronic device 100 can be a laptop computer, a tablet computer, a cellular phone, a wearable device, a health monitoring device, a home or building automation device, a home or building appliance, a craft or vehicle entertainment, control, and/or information system, a navigation device, and so on.

As noted above, the electronic device 100 can also include a strain-responsive sensor coupled to the display 104. The strain-responsive sensor can include an array of strain-sensitive elements 108 distributed in a pattern below the input surface 106. For simplicity of illustration, FIG. 1 is depicted without the strain-responsive sensor which may be included, partially and/or entirely, within the housing 102.

Figure 2A:
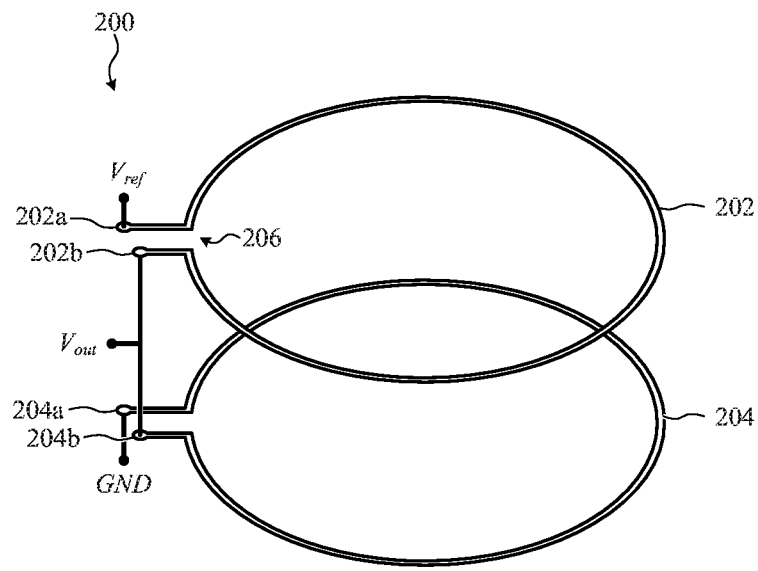
FIG. 2A depicts a simplified strain-sensitive element including a matched-pair of resistive structures coupled into a voltage-divider configuration that can be modeled as an open loop, particularly an open loop having two leads across which a changing magnetic field induces an electromotive force as a voltage.
Figure 2B:
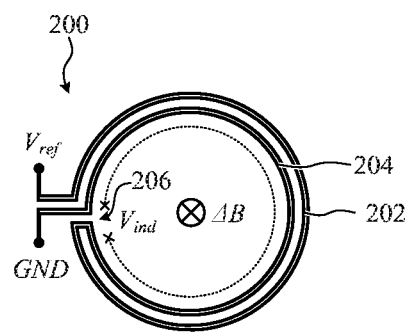
FIG. 2B depicts a top-down view of the strain-sensitive element of FIG. 2A.
Figure 2C:
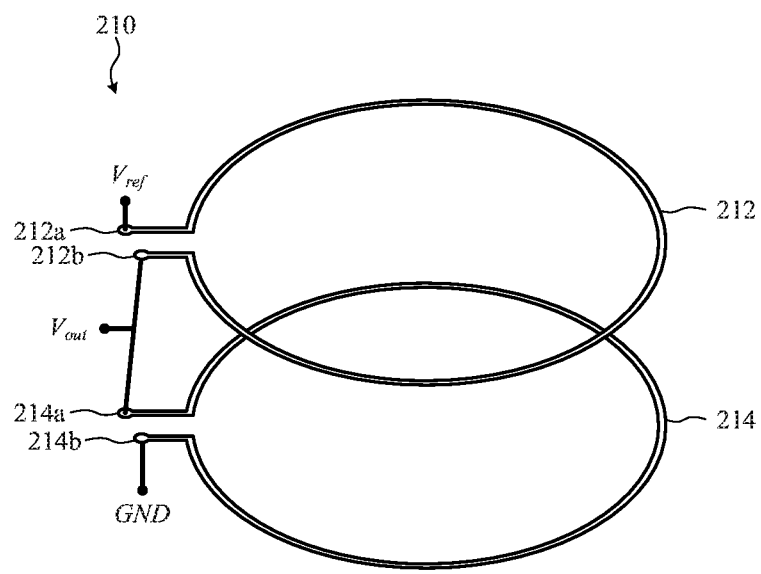
FIG. 2C depicts a simplified strain-sensitive element including a matched-pair of resistive structures coupled into a voltage-divider configuration that can be modeled as a closed loop, particularly a closed loop through which a changing magnetic field induces an electromotive force as a current.
Figure 2D:
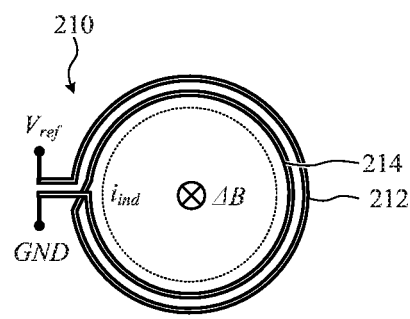
FIG. 2D depicts a top-down view of the strain-sensitive element of FIG. 2B.

Generally and broadly, FIGS. 2A-2D depict a simplified model of a strain-responsive sensor that includes a strain-sensitive element 200 defined by a matched-pair of resistive structures 202, 204 electrically coupled into a voltage divider configuration. In many embodiments, the voltage divider can be coupled to a balancing network (not shown) to form a Wheatstone bridge. The strain-sensitive element 200 can be a portion of a strain-responsive sensor used by an electronic device, such as the electronic device 100 in FIG. 1, to gather pressure or force input from a user of the electronic device. Generally, FIGS. 2A-2B depict a configuration of the strain-sensitive element 200 that can be modeled as an open loop and FIGS. 2C-2D depict a configuration of the strain-sensitive element 200 that can be modeled as a closed loop.

Specifically, FIG. 2A depicts a simplified model of a strain-sensitive element 200. The strain-sensitive element 200 includes an upper structure 202 and a lower structure 204. In many embodiments, the upper structure 202 and the lower structure 204 are resistive structures. The upper structure 202 has a first lead 202a and a second lead 202b. Similarly, the lower resistive structure has a first lead 204a and a second lead 204b. In the illustrated embodiment, the second lead 202b of the upper structure 202 is coupled to the second lead 204b of the lower structure 204.

In this configuration, a reference voltage $V_{ref}$ (or voltage signal) can be applied across the first lead 202a of the upper structure 202 and the first lead 204a of the lower structure 204. A voltage $V_{out}$ can be measured between the second lead 202b of the upper structure 202 and the second lead 204b of the lower structure 204.

FIG. 2B depicts a top-down view of the strain-sensitive element 200 of FIG. 2A. As a result of the configuration depicted, the strain-sensitive element 200 can be modeled as an open loop having a break 206. As a result of the break 206, a changing magnetic field ΔB induces a voltage $V_{ind}$ that may be summed with the output voltage $V_{out}$. As noted above, this configuration may result in undesirable noise corresponding to the magnitude of the induced voltage $V_{ind}$.

Many embodiments described herein are configured differently than the embodiment depicted in FIGS. 2A-2B. For example, FIG. 2C depicts another simplified model of a strain-sensitive element 210. As with the embodiment depicted in FIG. 2A, the strain-sensitive element 210 includes an upper structure 212 and a lower structure 214. In many embodiments, the upper structure 212 and the lower structure 214 are resistive structures. The upper structure 212 has a first lead 212a and a second lead 212b. Similarly, the lower resistive structure has a first lead 214a and a second lead 214b. In the illustrated embodiment, the second lead 212b of the upper structure 212 is coupled to the first lead 214a of the lower structure 214.

In this configuration, a reference voltage $V_{ref}$ (or voltage signal) can be applied across the first lead 212a of the upper structure 212 and the second lead 214b of the lower structure 214. A voltage $V_{out}$ can be measured between the second lead 212b of the upper structure 212 and the first lead 214a of the lower structure 214.

FIG. 2D depicts a top-down view of the strain-sensitive element 210 of FIG. 2C. As a result of the configuration depicted, the strain-sensitive element 210 can be modeled as an closed loop. As a result of the complete loop, a changing magnetic field $\Delta B$ induces a current $i_{ind}$. The magnitude of current entering the node at which the output voltage $V_{out}$ is measured is equal to the magnitude of current exiting that same node. Thus, the induced current $i_{ind}$ does not affect the output voltage $V_{out}$.

Figure 3A:
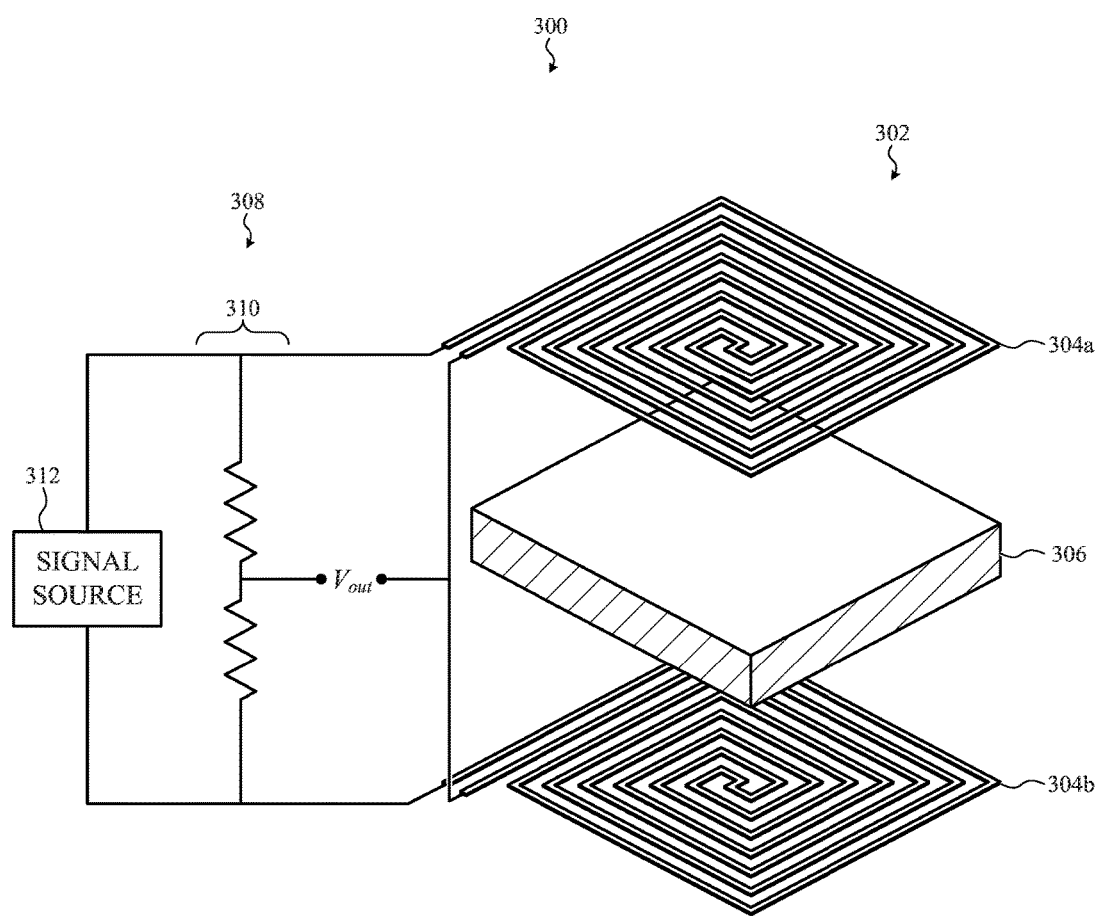
FIG. 3A depicts a strain-responsive sensor including a cross-section of a strain-responsive element including a matched-pair of resistive structures disposed on opposite sides of a substrate.
Figure 3B:
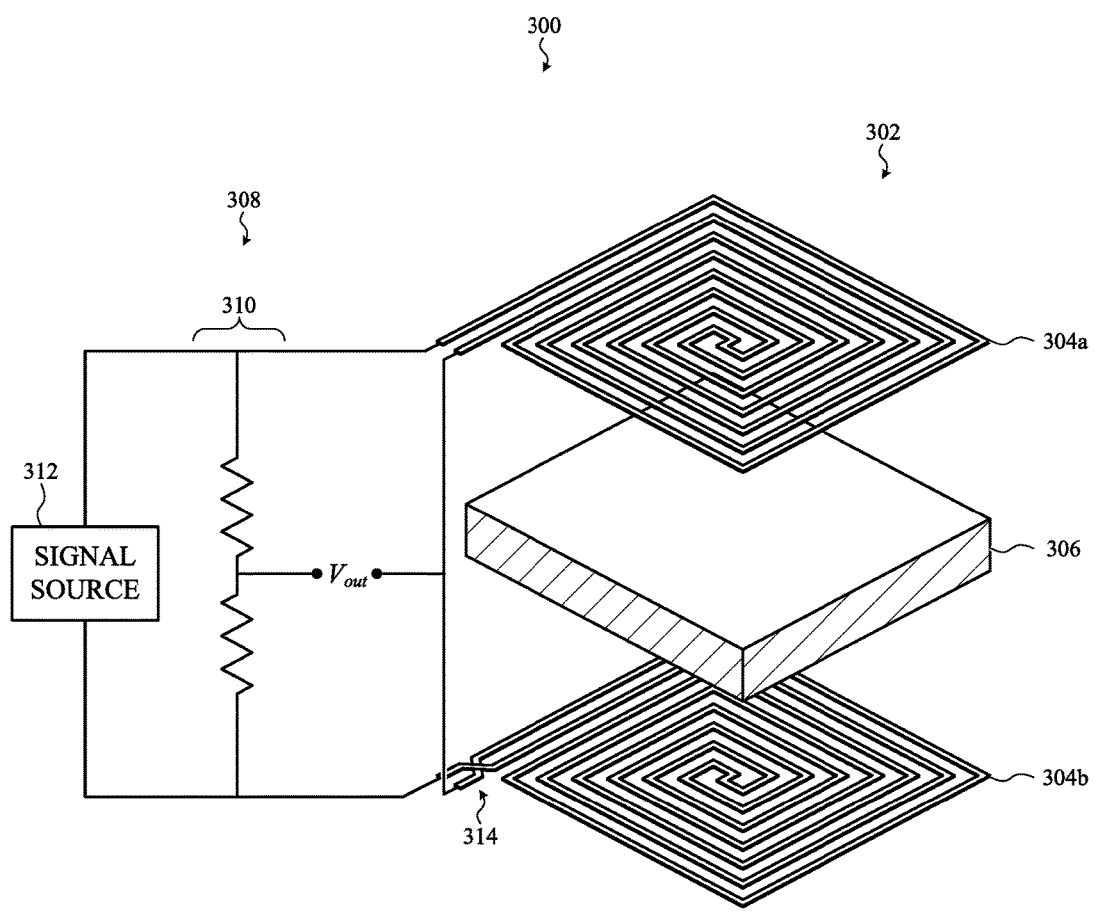
FIG. 3B depicts the strain-responsive sensor of FIG. 3A, specifically showing a physical crossover that reverses current through one of two resistive structures.
Figure 3C:
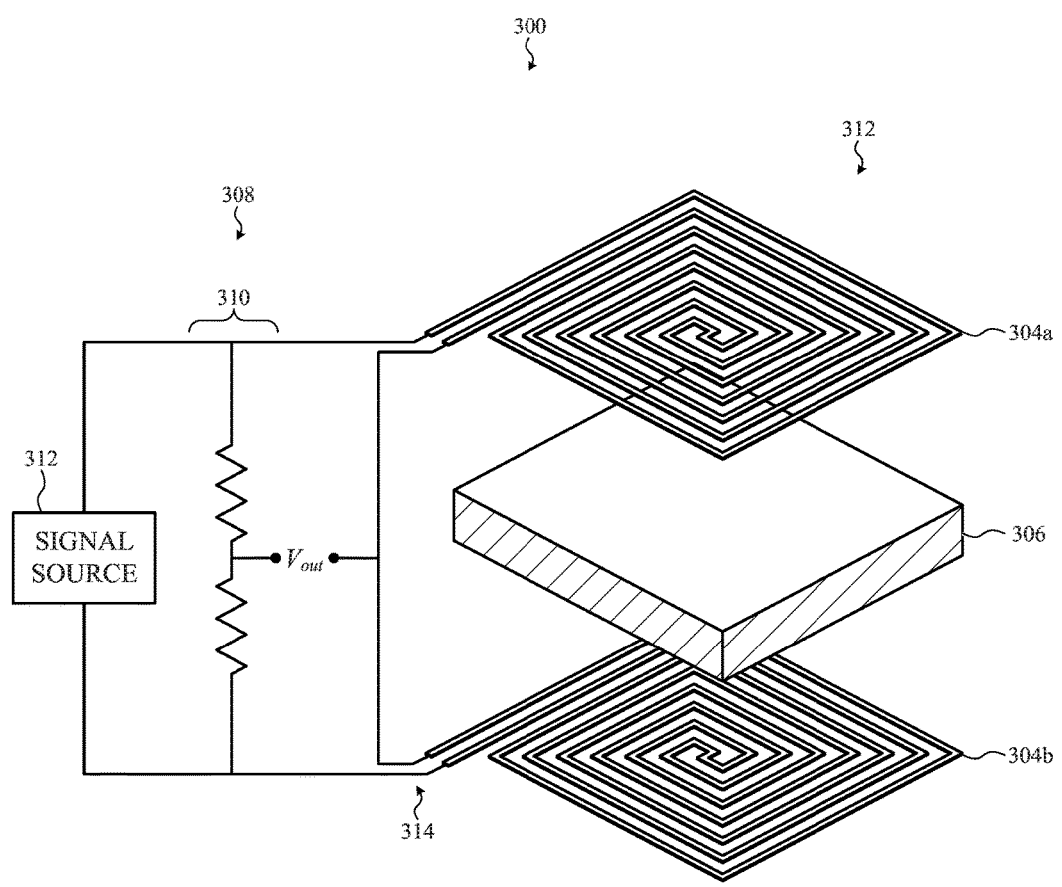
FIG. 3C depicts the strain-responsive sensor of FIG. 3A, specifically showing a soft crossover that reverses current through one of two resistive structures.

It may be appreciated that the simplified examples presented in FIGS. 2A-2D are provided only to illustrate the differences in topologies and configurations that may be susceptible or not susceptible to changing magnetic fields. In other words, it is appreciated that a strain-sensitive element may take any number of shapes beyond that of the circular loops depicted. For example, generally and broadly, FIGS. 3A-3C depict a strain-responsive sensor 300 including a strain-sensitive element 302 defined by a matched-pair of resistive structures 304a, 304b electrically coupled into a balancing network configuration. The strain-responsive sensor 300 can be used by an electronic device, such as the electronic device 100 in FIG. 1, to gather pressure or force input from a user of the electronic device. More specifically, the strain-responsive sensor 300 may flex in response to a force input applied by a user to an input surface of an electronic device. Flexure of the input surface causes the strain-sensitive element 302 to experience tension and/or compression which changes the resistance of each resistive structure 304a, 304b of the matched-pair.

In operation, a measurement of one or more electrical properties or outputs of the balancing network is obtained. The measurement can be used to resolve a value of the resistance of each resistive structure 304a, 304b. The resistances of the resistive structures 304a, 304b can be used to resolve a value corresponding to tension and/or compression experienced by the strain-sensitive element 302. This value can thereafter be used to resolve a magnitude, location, and/or movement path of the force input applied by a user to the input surface. The magnitude, location and/or movement path may be used by the electronic device to perform an operation for the user in response to the force input.

A resistive structure, such as either or both the resistive structures 304a, 304b, can be formed from any number of suitable materials that exhibit a change in resistance when strained. Such materials include, but are not limited to: nickel, constantan, karma, silicon, polysilicon, gallium alloys, isoelectric alloys, and so on. In some embodiments, a resistive structure may be optically transparent. In these cases, the resistive structure may be formed from a material such as, but not limited to: indium-tin oxide, carbon nanotubes, metal nanowires, or any combination thereof. In many case, the resistive structure is formed from a material having a known or determinable gauge factor. In many cases, the gauge factor may be greater than 1.0.

In some cases, the strain-responsive sensor 300 includes more than one strain-sensitive element 302. The multiple strain-sensitive elements 302 may be arranged in any suitable pattern including, but not limited to: an array or grid pattern, a circular pattern, a hub-and-spoke pattern, or any other suitable pattern. The multiple strain-sensitive elements may each take the same size and shape although this is not required. The strain-sensitive elements may be disposed onto the same substrate, or may be disposed onto multiple substrates.

In further embodiments, a single electronic device (e.g., the electronic device 100 as shown in FIG. 1) may include more than one strain-responsive sensor 300. For example, a strain-responsive sensor 300 including a single strain-sensitive element 302 may be associated with a button of an electronic device whereas another strain-responsive sensor 300 including multiple strain-sensitive elements 302 may be associated with a display of the same electronic device. Accordingly, it may be appreciated that, generally and broadly, an electronic device may incorporate any number of strain-responsive sensors, such as described herein, in any number of suitable and implementation-specific manners.

With specific reference to FIG. 3A, there is shown a portion of a strain-responsive sensor 300, specifically depicting a strain-sensitive element 302 that is defined by a matched-pair of resistive structures disposed on opposite sides of a substrate. In the illustrated embodiment, the matched-pair of resistive structures includes an upper resistive structure 304a and a lower resistive structure 304b coupled to opposite sides of a substrate 306.

The strain-sensitive element 302 is illustrated in an exploded view. In an implementation of the illustrated embodiment, the upper resistive structure 304a and the lower resistive structure 304b are disposed onto opposite faces of the substrate 306 using a suitable disposition technique such as, but not limited to: vapor deposition techniques, printing techniques, roll-to-roll processing techniques, gravure techniques, pick and place techniques, adhesive techniques, mask-and-etch techniques, and so on. In some cases, the upper resistive structure 304a and the lower resistive structure 304b are formed in two stages of the same manufacturing process. In other cases, the upper resistive structure 304a and the lower resistive structure 304b are formed simultaneously onto the substrate.

The substrate 306 is configured to flex in a free, controlled, or limited manner. For example, the substrate 306 may be supported along its perimeter by a chassis or frame. The substrate 306 may be single layer or stratiform including materials such as, but not limited to: plastic, metal, ceramic, glass, polyamide, polyethylene terephthalate, or any combination thereof. The substrate 306 may have any suitable thickness, but in many embodiments, the substrate 306 is less than 1 mm thick. In further embodiments, the substrate 306 may be several microns thick. It is appreciated that the embodiment depicted is not drawn to scale.

The substrate 306 can be transparent, translucent, or opaque. Typically the substrate 304 is electrically insulating, although this may not be required of all embodiments. The substrate 306 may be a multi-purpose element. For example, the substrate 306 may also function as an optical reflector and/or as an electromagnetic or capacitive shield. The substrate 306 may be partially or entirely electrically isolated, biased to a specific voltage, floating, or grounded.

The upper resistive structure 304a and the lower resistive structure 304b are formed from a material that exhibits changes in electrical resistance when strained such as, but not limited to: peizoresistive materials, piezoelectric materials, and so on. The upper resistive structure 304a and the lower resistive structure 304b may be optically transparent, opaque, or translucent.

In some cases, the strain-responsive sensor 300 can include more than one strain-sensitive element, such as shown in FIG. 1. In such an embodiment, different strain-sensitive elements may be made from different materials and/or may have different optical properties. For example, a strain-sensitive element adjacent to a perimeter of an input surface, such as the input surface 106 shown in FIG. 1, may be optically translucent or opaque whereas a strain-sensitive element nearby a geometric center of the input surface may be optically transparent.

The upper resistive structure 304a and the lower resistive structure 304b are aligned with one another and take the same shape. As illustrated, the upper resistive structure 304a is defined by an electrically-conductive trace that has a clockwise rectangular spiral shape that doubles-back upon its path once the center of the rectangular spiral is reached. The lower resistive structure 304b is also defined by an electrically-conductive trace that has a clockwise rectangular spiral shape that doubles-back upon its path once the center of the rectangular spiral is reached. In the illustrated embodiment, the lower resistive structure 304b mirrors the path of the upper resistive structure 304a across the plane of the substrate 306. In other cases, an electrically-conductive trace can have another shape that doubles back one or more times from one or more central or non-central locations.

Although the upper resistive structure 304a and the lower resistive structure 304b are shown taking a clockwise-oriented rectangular spiral shape that doubles-back, such a configuration is merely an example, and other shapes and circuit trace paths are contemplated.

The upper resistive structure 304a and the lower resistive structure 304b are coupled to an electrical circuit 308. The electrical circuit 308 can be implemented in any number of suitable ways; one simplified example schematic is depicted. The electrical circuit 308 as illustrated includes two reference resistors 310 connected in series. The two reference resistors 310 have a known resistance and are coupled to the upper resistive structure 304a and the lower resistive structure 304b in a balancing network configuration, such as a Wheatstone bridge configuration.

The two reference resistors 310 may be independent high-precision resistors, or may be formed as an array or network of independent resistors. In some cases, the two reference resistors 310 may be variable; the resistance of the two reference resistors 310 may be changed and/or adjusted dynamically.

The electrical circuit 308 also includes a signal source 312 which may apply an electrical signal or an electrical bias to the balancing network. The electrical circuit 308 thereafter measures an output voltage $V_{out}$ of the balancing network.

As a result of the matching between the upper resistive structure 304a and the lower resistive structure 304b, environmental conditions affect the upper resistive structure 304a and the lower resistive structure 304b in substantially the same manner. In other words, a change in the resistance of the upper resistive structure 304a as a result of an environmental condition may be matched by an equivalent change in the resistance of the lower resistive structure 304b. These changes in resistance cancel as a result of the balancing network configuration. Therefore, the known resistances of the two reference resistors 310 can be used with the measured output voltage $V_{out}$ and an approximation of a neutral axis of the substrate 306 to resolve, determine, approximate, or estimate the resistances of one or both of the upper resistive structure 304a and the lower resistive structure 304b. In turn, these resistance measurements may be used by an electronic device, or by another component of the electrical circuit 308 not shown in FIG. 3A, to resolve a value of a magnitude of strain experienced by the substrate 306.

As noted above, changing magnetic fields can induce a measurable electromotive force within the upper resistive structure 304a and the lower resistive structure 304b. Particularly, a changing magnetic field may induce a measureable voltage across the leads of both the upper resistive structure 304a and the lower resistive structure 304b. As a result of the configuration shown, in which current i flows through the upper resistive structure 304a and the lower resistive structure 304b in opposite directions, the measureable voltage that results from the induced electromotive force may affect the output voltage $V_{out}$. In other words, the depicted topology is similar to the open-loop topology shown in FIG. 2A.

In some embodiments, the upper resistive structure 304a and the lower resistive structure 304b can be positioned a certain minimum distance away from elements within an electronic device that may generate such fields. This may minimize the effect that fields generated by such devices have on the strain-sensitive element 302.

For example, the strain-sensitive element 302 may be positioned away from an element such as a speaker, a microphone, a haptic feedback component, a magnetic coupling, and so on. In other cases, the output voltage $V_{out}$ may be filtered or adjusted based on whether an element that can generate a changing magnetic field is in operation. For example, the output voltage $V_{out}$ may be filtered based on an audio signal simultaneously output from a speaker element nearby the strain-sensitive element 302. The implementation of such a filter may vary from embodiment to embodiment.

In other cases, especially for electronic devices having a small form factor, it may not be possible to position the strain-sensitive element 302 a sufficient distance away from changing magnetic field sources. Accordingly, other embodiments described herein include a construction or implementation that causes current i to flow in the same direction through the upper resistive structure 304a and the lower resistive structure 304b. With this topology, current may be induced by nearby changing magnetic fields instead of voltage.

For example, FIGS. 3B-3C each depict a strain-sensitive element 302 that can be positioned adjacent to a changing magnetic field source. These strain-sensitive elements include at least one of a physical crossover or a soft crossover that reverses the current direction through one resistive structure of a matched-pair of resistive structures such that the current direction through each resistive structure is the same.

For example, FIG. 3B depicts a portion of a strain-responsive sensor 300, specifically showing a strain-sensitive element 302 that is defined by a matched-pair of resistive structures disposed on opposite sides of a substrate. In the illustrated embodiment, the matched-pair of resistive structures includes an upper resistive structure 304a, a lower resistive structure 304b, and a substrate 306. In this embodiment, two leads of the lower resistive structure 304b are twisted at a crossover 314. As a result of the crossover 314, current flows through the lower resistive structure 304b in the same direction as the upper resistive structure 304a. This configuration may be generally referred to as a "physical crossover." A physical crossover can be implemented in any suitable manner including, but not limited to: layered traces, vias, jumpers, and so on.

In another example, FIG. 3C depicts a portion of a strain-responsive sensor 300, specifically showing a strain-sensitive element 302 that is defined by a matched-pair of resistive structures disposed on opposite sides of a substrate. In the illustrated embodiment, the matched-pair of resistive structures includes an upper resistive structure 304a, a lower resistive structure 304b, and a substrate 306. In this embodiment, two leads that couple the electrical circuit 308 to the lower resistive structure 304b are crossed at a crossover 314. In some examples, the crossover 314 can be implemented via a software-controlled switch, a hardware-controlled switch, or any other suitable manner. As a result of the crossover 314, current flows through the lower resistive structure 304b in the same direction as the upper resistive structure 304a. This configuration may be generally referred to as a "soft crossover." As with the physical crossover described above with reference to FIG. 3B, a soft crossover can be implemented in any suitable manner.

It may be appreciated that the foregoing description of the crossover embodiments depicted in FIGS. 3B-3C, and various alternatives thereof and variations thereto are presented, generally, for purposes of explanation, and to facilitate a thorough understanding of various possible configurations of a strain-responsive sensor as contemplated herein. However, it will be apparent to one skilled in the art that some of the specific details presented herein may not be required in order to practice a particular described embodiment, or an equivalent thereof. For example, although many embodiments are described with reference to a matched-pair of resistive sensors, matching may not be required of all embodiments.

Thus, the foregoing and following descriptions and specific embodiments are understood to be presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings. Particularly, it may be understood that the depicted in FIGS. 3B-3C can be implemented in a number of suitable ways.

For example, a physical crossover or a soft crossover can be associated with an upper resistive structure instead of a lower resistive structure. In some cases, a strain-responsive sensor can include multiple strain-sensitive elements which each can be implemented in different ways. More specifically, some strain-sensitive elements may include crossovers in upper resistive structures whereas others include crossovers in lower resistive structures. In some cases, physical crossovers may be used with soft crossovers.

Figure 4A:
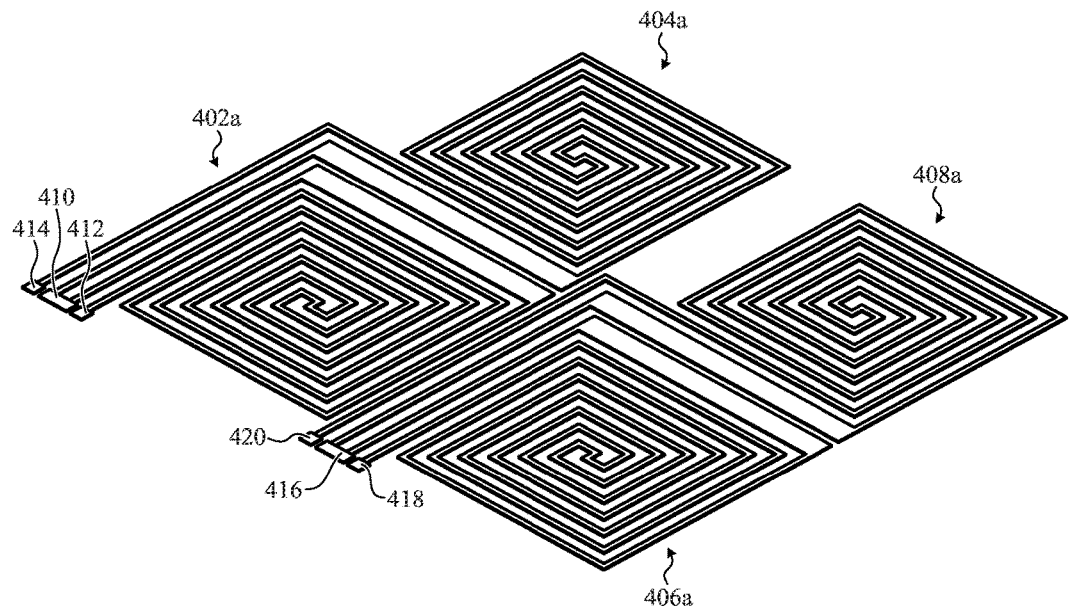
FIG. 4A depicts an example strain-responsive sensor that implements lead sharing.
Figure 4B:
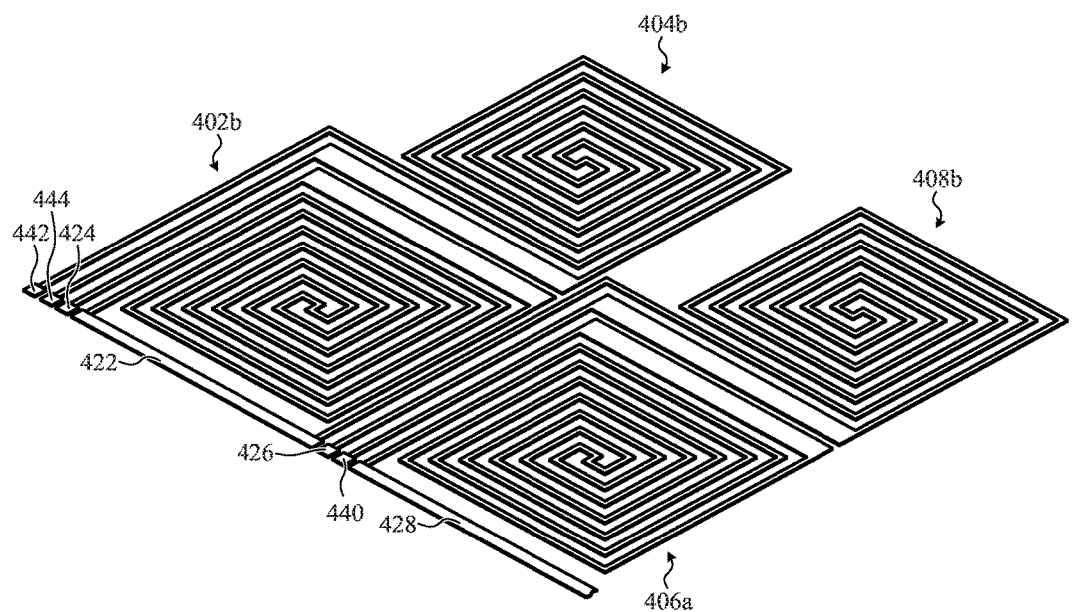
FIG. 4B depicts the strain-responsive sensor of FIG. 4A, specifically showing a different lead sharing configuration.

In other embodiments, a physical crossover may be formed in a manner different from that shown in FIG. 3B. For example, FIGS. 4A-4B depict a strain-responsive sensor including four strain-sensitive elements each defined by a matched-pair of resistive structures that may be coupled into a balancing network configuration, such as shown in FIGS. 3A-3C. In these illustrated embodiments, the resistive structures of the embodiment depicted in FIG. 4A are configured to conduct current in the same direction as the resistive structures of the embodiment depicted in FIG. 4B.

FIGS. 4A-4B, as a pair, illustrate an example strain-responsive sensor that is implemented with lead sharing. Lead sharing, as used herein, refers to strain-sensitive elements that share at least one lead. Lead sharing may be used to reduce the number of leads required to connect a strain-responsive sensor including multiple strain-sensitive elements to an electrical circuit, such as the electrical circuit 308 depicted in FIGS. 3A-3C.

In these embodiments, four strain-sensitive elements each including two resistive structures are depicted. A top resistive structure of each strain-sensitive element is depicted in FIG. 4A and a bottom resistive structure of each strain-sensitive element is depicted in FIG. 4B.

Without lead sharing, the number of leads required to connect the four strain-sensitive elements depicted in FIGS. 4A-4B to an electronic circuit would be sixteen because two leads are required for each resistive structure and each strain-sensitive element includes two resistive structures. In the depicted embodiment, however, one implementation of lead sharing is shown. In this case, lead sharing reduces the total number of leads required to thirteen. It may be appreciated that, in many embodiments, only input leads (e.g., drive leads) of resistive structures are shared; sharing of output leads (e.g., sense leads) may increase the difficulty of distinguishing resistances of the resistive structures sharing output leads.

As noted above, with reference to FIG. 4A, there is shown four resistive structure portions of four strain-sensitive elements that may be associated with a strain-responsive sensor as described herein. These resistive structures are associated with corresponding (and matched) resistive structures depicted in FIG. 4B. In another phrasing, the resistive structures depicted in FIG. 4A may be respectively referred to as the upper resistive structures of four strain-responsive sensors and the resistive structures depicted in FIG. 4B may be respectively referred to as the lower resistive structures of the same four strain-responsive sensors.

Particularly, FIG. 4A depicts a resistive structure 402a which may correspond to a resistive structure 402b depicted in FIG. 4B. Similarly, FIG. 4A depicts a resistive structure 404a which may correspond to a resistive structure 404b depicted in FIG. 4B. Similar relationships are understood for the resistive structures 406a, 406b and the resistive structures 408a, 408b shown in FIG. 4A and FIG. 4B respectively.

In this embodiment, the resistive structure 402a is configured to share a drive lead with the resistive structure 404a, illustrated as the shared drive lead 410. The resistive structure 402a has an independent sense lead 412 and the resistive structure 404a has an independent sense lead 414. The shared drive lead 410 can be implemented in any suitable manner. In one example, the shared drive lead 410 is formed by physically coupling the respective drive leads of the resistive structure 402a and the resistive structure 404a using an electrically conductive jumper. Similarly, the resistive structure 406a is configured to share a drive lead with the resistive structure 408a, illustrated as the shared drive lead 416. The resistive structure 406a has an independent sense lead 418 and the resistive structure 408a has an independent sense lead 420. The shared drive lead 416 can be implemented in any suitable manner. In one example, the shared drive lead 416 is formed by physically coupling the respective drive leads of the resistive structure 406a and the resistive structure 408a using an electrically conductive jumper.

It may be appreciated that implementing a crossover, either a physical crossover or a soft crossover, within an embodiment also implementing shared leads may be challenging. More particularly, as noted above, resistive structures typically only share a drive electrode. Accordingly, implementing a crossover within the lead-sharing topology shown in FIG. 4A may not be preferable, as to do so would result in sense leads being shared between various resistive structures. Accordingly, an alternative configuration of lead sharing is shown in FIG. 4B this configuration, generally and broadly, shifts the lead sharing such that current direction within each resistive structure is reversed with respect to FIG. 4A.

In this embodiment, the resistive structure 402b is configured to share a drive lead with the resistive structure 408b, illustrated as the shared drive lead 422. The resistive structure 402b has an independent sense lead 424 and the resistive structure 408b has an independent sense lead 426. As with the embodiment depicted in FIG. 4A, the shared drive lead 422 can be implemented in any suitable manner. In one example, the shared drive lead 422 is formed by physically coupling the respective drive leads of the resistive structure 402b and the resistive structure 408b using an electrically conductive jumper.

The resistive structure 406b is configured to share a drive lead with another resistive structure not depicted, illustrated as the shared drive lead 428. The resistive structure 406b has an independent sense lead 430. The shared drive lead 428 can be implemented in any suitable manner. In one example, the shared drive lead 428 is formed by physically coupling the respective drive leads of the resistive structure 406b and the other resistive structure using an electrically conductive jumper.

The resistive structure 404b is configured to operate independently. In other words, the resistive structure 404b does not share a drive lead 432 or a sense lead 434 with any other resistive structure.

It may be appreciated that the foregoing description of the lead sharing embodiments depicted in FIGS. 4A-4B, and various alternatives thereof and variations thereto are presented, generally, for purposes of explanation, and to facilitate a thorough understanding of various possible configurations of a strain-responsive sensor as contemplated herein. However, it will be apparent to one skilled in the art that some of the specific details presented herein may not be required in order to practice a particular described embodiment, or an equivalent thereof.

Thus, the foregoing and following descriptions and specific embodiments are understood to be presented for the limited purposes of illustration and description. These descriptions are not target to be exhaustive or to limit the disclosure to the precise forms recited herein. To the contrary, it will be apparent to one of ordinary skill in the art that many modifications and variations are possible in view of the above teachings. Particularly, it may be understood that the sharing of leads depicted in FIGS. 4A-4B can be implemented in a number of suitable ways.

For example, some embodiments may include more than two resistive structures that share a drive lead. In other cases, an electrically conductive jumper between two (or more) drive leads of resistive structures may be implemented in a manner different than illustrated. Suitable materials for an electrically conductive jumper include, but are not limited to: metals, conductive paste, metal nanowire dispersions, solder connections, wire jumpers, physical vapor deposition-deposited conductive regions, or any other suitable electrical connection. In other embodiments, a jumper may be formed by subtractive manufacturing. For example, in one embodiment, leads of all resistive structures may be formed coupled to one another. A subsequent manufacturing step such as laser etching, laser ablation, particle abrasion, chemical etching and so on may be used to selectively remove material between one or more leads.

Thus, it may be appreciated that many suitable manufacturing methods may be used to form a strain-responsive sensor with multiple strain-sensitive elements, some of which may share leads, that may be placed and used nearby a changing magnetic field source.

Figure 5:
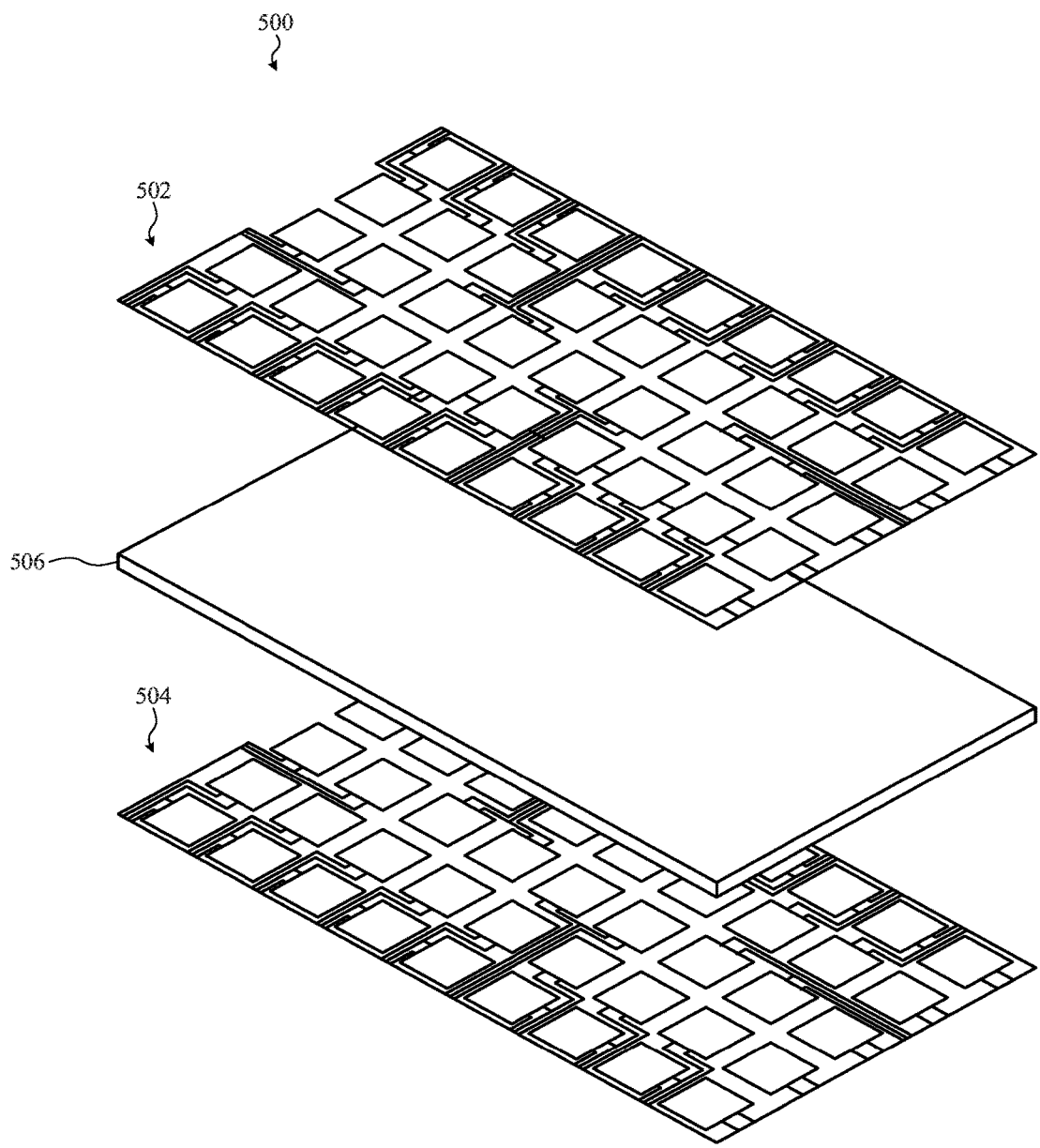
FIG. 5 depicts a strain-responsive sensor including an array of strain-sensitive elements each including a matched-pair of resistive structures disposed on opposite sides of a substrate.

FIG. 5 illustrates an example strain-responsive sensor that is implemented with lead sharing and that may be positioned nearby changing magnetic field sources, such as haptic elements, speakers, microphones, and so on. The strain-responsive sensor includes forty-five separate strain-sensitive elements, each including two resistive structures for a total of ninety resistive structures. This strain-responsive sensor may be included below, or integrated with, a display element of an electronic device, such as the electronic device 100 of FIG. 1. In such an embodiment, the various leads (shared or otherwise) associated with the strain-responsive sensor 500 may be concealed behind a bezel of the display.

In the illustrated embodiment, there is shown a strain-responsive sensor 500 that includes forty-five independent strain-sensitive elements, each defined by a pair of resistive structures disposed as an upper layer 502 and a lower layer 504 on opposite sides of a substrate 506.

The strain-responsive sensor 500 also implements drive lead sharing in a manner that facilitates incorporation of physical or soft crossovers that reverse current flow in one of the two resistive structures of each strain-sensitive element. As illustrated, the strain-sensitive elements of the strain-responsive sensor 500 are arranged into five columns and nine rows. In this embodiment, lead sharing can be implemented in the upper layer 502 between adjacent resistive structures, such as resistive structures in adjacent columns. In other embodiments, lead sharing can be implemented between resistive structures in adjacent rows. In still further embodiments, lead sharing can be implemented in any other suitable manner. In certain cases, such as depicted, lead sharing may not be implemented for the bottom row of resistive structures.

Lead sharing pairs may be shifted in the lower layer 504. For example, the first row of resistive structures may have independent leads, shifting the lead sharing pattern of the upper layer 502 down by one row. In this manner, a physical or soft crossover can be implemented such that current flows within the various resistive structures of the lower layer 504 in the same direction as the current within the various resistive structures of the upper layer 502.

Figure 6:
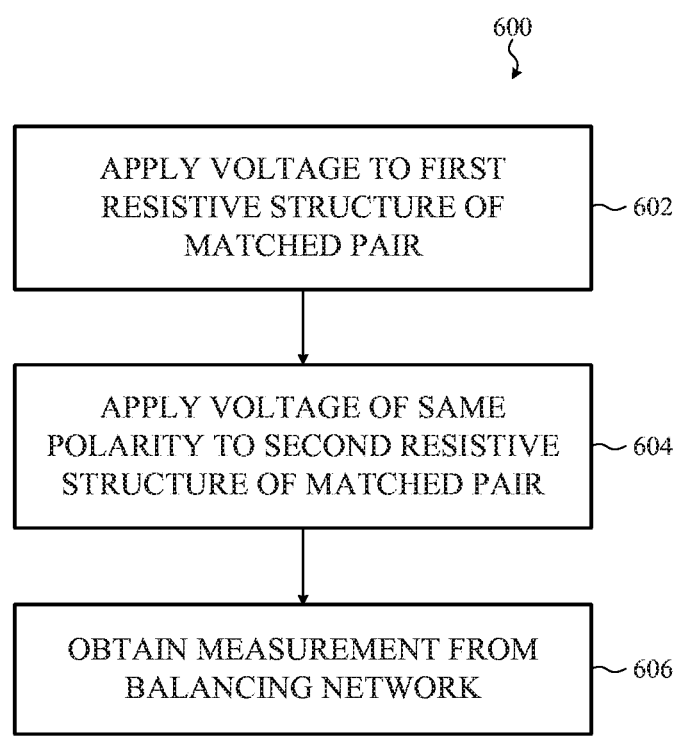
FIG. 6 depicts example operations of a method of operating a strain-responsive sensor in a manner that avoids magnetic interference.

Turning now to FIG. 6, there is shown some example operations of a method of operating a strain-responsive sensor in a manner that avoids magnetic interference. The method 600 can begin at operation 602 in which a voltage is applied to a resistive structure. At operation 604, a voltage of the same polarity is applied to a second resistive structure. At operation 606, a measurement is obtained from a balancing network that is electrically coupled to the first and second resistive structure.

For example, embodiments described herein are not necessarily limited to measuring resistive sensors or strain sensors, and other sensors and other sensor types can be accurately measured using the systems and method described herein. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to that particular embodiment to the exclusion of others.

Additionally, although many embodiments are described herein with respect to match-pairs of resistive structures, it may be understood that such a configuration may not be required for all embodiments or implementations. For example, as noted above, the matched properties of associated resistive structures may assist with noise reduction. However, in some embodiments, a desired degree of noise reduction may not require matching between resistive structures. In these embodiments, different resistive structures can be formed from different materials, may exhibit different resistances, and so on.

One may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A strain-responsive sensor comprising:
a planar substrate comprising:
a first surface; and
a second surface opposite the first surface; and
a strain-sensitive element comprising:
a first resistive structure disposed on the first surface following a first open-loop path;
a second resistive structure mirroring the first resistive structure, disposed on the second surface following a second open-loop path; and
a crossover electrically coupling the first resistive structure to the second resistive structure to define a single closed-loop structure that directs current through the first and second resistive structures in a same direction.

2. The strain-responsive sensor of claim 1, wherein the first resistive structure is formed from at least one of indium tin oxide, Constantan, Karma alloys, or isoelastic alloys.

3. The strain-responsive sensor of claim 1, wherein the second open-loop path mirrors the first open loop path.

4. The strain-responsive sensor of claim 1, wherein the crossover is a physical crossover.

5. The strain-responsive sensor of claim 1, wherein the crossover is a soft crossover.

6. The strain-responsive sensor of claim 1, wherein:
the first resistive structure comprises:
a drive lead; and
a sense lead; and
the drive lead is shared with a third resistive structure.

7. The strain-responsive sensor of claim 1, wherein the strain-sensitive element is a member of a group of strain-sensitive elements.

8. The strain-responsive sensor of claim 1, further comprising:
a first reference resistor; and
a second reference resistor; wherein
the first resistive structure, the second resistive structure, the first reference resistor, and the second reference resistor are coupled in a balancing network.

9. The strain-responsive sensor of claim 8, wherein the electrical circuit is configured to measure a voltage output from the balancing network.

10. An input sensor comprising:
a planar substrate comprising:
an upper surface; and
a lower surface opposite the upper surface;
a strain-responsive sensor comprising an array of strain-sensitive elements, each strain-sensitive element comprising:
an upper resistive structure disposed on the upper surface following a first open-loop path;
a lower resistive structure disposed on the lower surface opposite the upper resistive structure and following a second open-loop path mirroring the first open-loop path; and
a crossover electrically coupling the lower resistive structure to the upper resistive structure to define a single closed-loop structure; wherein:
a first pair of upper resistive structures are configured to share a drive lead;
a second pair of lower resistive structures are configured to share a drive lead.

11. The input sensor of claim 10, wherein the substrate is formed from at least one of glass, polyamide, polyethylene terephthalate.

12. The input sensor of claim 10, wherein at least one upper resistive structure has a spiral shape.

13. The input sensor of claim 10, wherein each upper resistive structure is formed from the same material.

14. The input sensor of claim 13, wherein each lower resistive structure is formed from the same material.

15. The input sensor of claim 10, wherein the substrate is coupled to a display of an electronic device.

16. The input sensor of claim 10, wherein the crossover is a physical crossover.

17. A method of operating a strain-responsive sensor comprising a mirrored pair of resistive structures disposed on opposite sides of a planar substrate, each resistive structure following an open-loop path, the method comprising:
applying a voltage across the strain-responsive sensor such that current flows through the mirrored pair of resistive structures in a closed loop defined from a reference frame normal to the substrate;
measuring an output voltage of a balancing network electrically coupled to the mirrored pair of resistive structures; and
associating the measured output voltage with an amount of strain experienced by one or both resistive structures of the mirrored pair of resistive structures.

18. The method of claim 17, further comprising associating the amount of strain with an amount of force applied to the strain-responsive sensor.

19. The method of claim 17, further comprising associating the amount of strain experienced by one or both of the resistive structures of the mirrored pair of resistive structures with an amount of force applied to the strain-responsive sensor.

20. The method of claim 17, wherein both resistive structures of the mirrored pair of resistive structures are formed from a same material.

* * * * *